(12) United States Patent
Fuller

(10) Patent No.: US 12,024,313 B1
(45) Date of Patent: *Jul. 2, 2024

(54) SYSTEMS AND METHODS FOR SATELLITE CONSTELLATION LAUNCH USING AIR-LAUNCHED VEHICLES

(71) Applicant: Northrop Grumman Systems Corporation, Falls Church, VA (US)

(72) Inventor: John David Fuller, Ashburn, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 987 days.

This patent is subject to a terminal disclaimer.

(21) Appl. No.: 16/998,516

(22) Filed: Aug. 20, 2020

Related U.S. Application Data

(63) Continuation of application No. 16/042,606, filed on Jul. 23, 2018, now Pat. No. 10,752,383, which is a
(Continued)

(51) Int. Cl.
*B64G 1/00* (2006.01)
*B64C 39/02* (2023.01)
(Continued)

(52) U.S. Cl.
CPC ............ *B64G 1/005* (2013.01); *B64C 39/024* (2013.01); *B64G 1/1085* (2013.01); *B64G 1/242* (2013.01); *B64U 10/25* (2023.01); *B64U 2101/60* (2023.01)

(58) Field of Classification Search
CPC ...... B64G 1/005; B64G 1/1085; B64G 1/242; B64G 1/14; B64G 1/002; B64G 1/007; B64G 1/401; B64G 1/402; B64G 1/641; B64G 1/12; B64G 1/10; B64G 1/281; B64G 1/24; B64G 1/26; B64G 1/64; B64G 5/00;
(Continued)

(56) References Cited

U.S. PATENT DOCUMENTS 4,901,949 A 2/1990 Elias
5,199,672 A 4/1993 King et al.
(Continued)

FOREIGN PATENT DOCUMENTS

DE 3921520 7/1990

*Primary Examiner* — Jelani A Smith
*Assistant Examiner* — Paul A Castro
(74) *Attorney, Agent, or Firm* — Christensen, Fonder, Dardi & Herbert PLLC

(57) ABSTRACT

Systems and methods for calculating launch sites for a satellite constellation are provided. A carrier aircraft may be configured to launch a first satellite into the first orbit and a second satellite into the second orbit. In some embodiments, information about an accessible range of the aircraft may be received. Based on the received information, a geographical area that the aircraft can access without landing may be calculated. Using received information and the orbit parameters of the first orbit and the second orbit, a first launch site for launching the first satellite and a second launch site for launching the second satellite may be calculated. The first launch site may comprise a first geographical position and a first launch time, and the second launch site may comprise a second geographical position and a second launch time. Both launch sites may be within the calculated geographical area.

8 Claims, 11 Drawing Sheets

Related U.S. Application Data continuation of application No. 14/788,214, filed on Jun. 30, 2015, now Pat. No. 10,029,806.

(60) Provisional application No. 62/151,969, filed on Apr. 23, 2015.

(51) Int. Cl.
*B64G 1/10* (2006.01)
*B64G 1/24* (2006.01)
*B64U 10/25* (2023.01)
*B64U 101/60* (2023.01)

(58) Field of Classification Search
CPC ........ B64G 1/1021; B64G 1/222; B64G 1/34; B64G 1/36; B64G 1/404; B64G 1/44; B64G 1/60; B64G 1/66; B64D 5/00; B64D 3/00; B64D 1/12; B64D 39/00; B64D 1/10; B64D 1/04; B64D 1/08; B64D 7/08; B64C 25/08; B64C 1/26; G05D 1/0883; F41F 3/06
See application file for complete search history.

(56) References Cited

U.S. PATENT DOCUMENTS

| | | | |
|---|---|---|---|
| 5,402,965 A | 4/1995 | Cervisi et al. | |
| 6,068,211 A | 5/2000 | Toliver et al. | |
| 6,119,985 A | 9/2000 | Clapp et al. | |
| 6,193,187 B1 | 2/2001 | Scott et al. | |
| 6,260,802 B1 | 7/2001 | Hampsten | |
| 6,921,051 B2 * | 7/2005 | Lopata | B64G 1/10 |
| | | | 244/158.9 |
| 7,198,230 B2 | 4/2007 | Yung et al. | |
| 7,252,270 B2 | 8/2007 | Mitzmacher | |
| 7,255,308 B1 | 8/2007 | Murphy | |
| 7,610,841 B2 | 11/2009 | Padan | |
| 8,020,482 B1 | 9/2011 | McCants, Jr. | |
| 8,113,101 B1 | 2/2012 | McCants, Jr. | |
| 8,332,085 B2 * | 12/2012 | Omar | G05D 1/107 |
| | | | 701/13 |
| 8,511,617 B2 | 8/2013 | Caplin et al. | |
| 8,798,922 B2 | 8/2014 | Tillotson et al. | |
| 9,075,415 B2 | 7/2015 | Kugelmass | |
| 9,557,742 B2 | 1/2017 | Paduano et al. | |
| 9,944,410 B1 * | 4/2018 | Budd | B64D 5/00 |
| 10,029,806 B2 | 7/2018 | Fuller | |
| 10,752,383 B1 | 8/2020 | Fuller | |
| 2007/0055417 A1 * | 3/2007 | Chatfield | G01C 23/005 |
| | | | 701/13 |
| 2014/0240497 A1 | 8/2014 | Shefer | |
| 2014/0316616 A1 | 10/2014 | Kugelmass | |
| 2016/0125740 A1 | 5/2016 | Pasko et al. | |
| 2017/0129626 A1 | 5/2017 | Bryan et al. | |

* cited by examiner

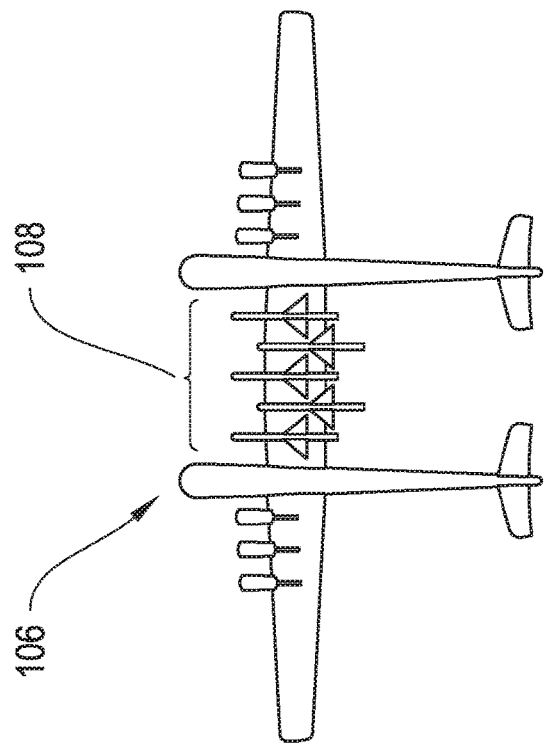
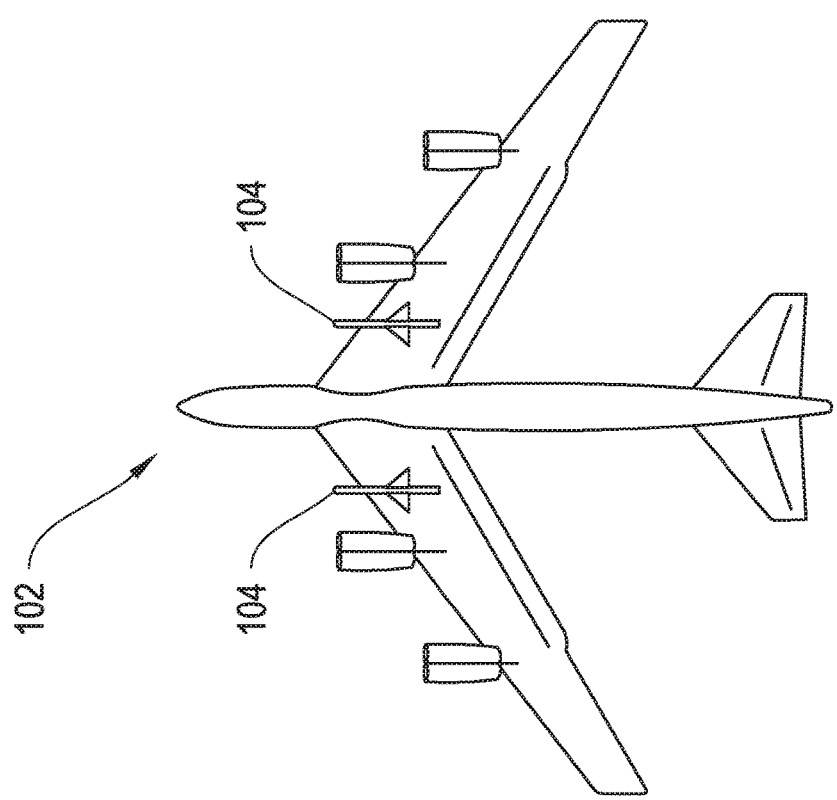
Fig. 1

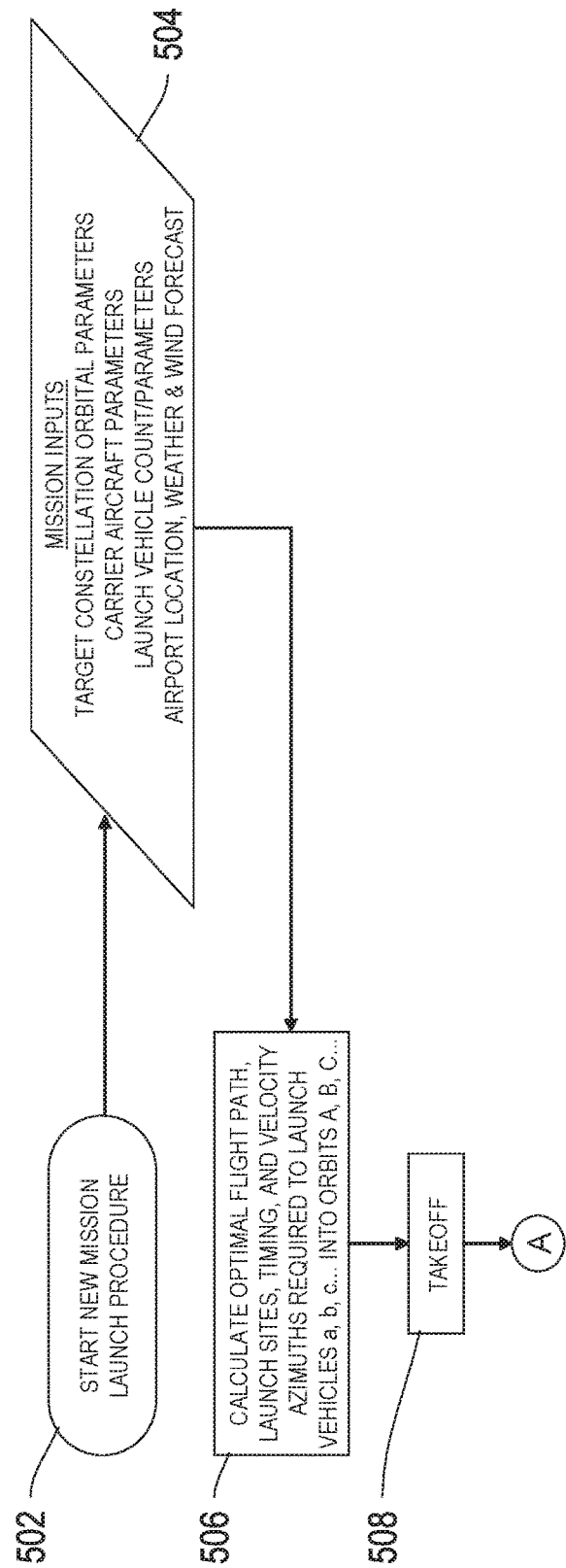

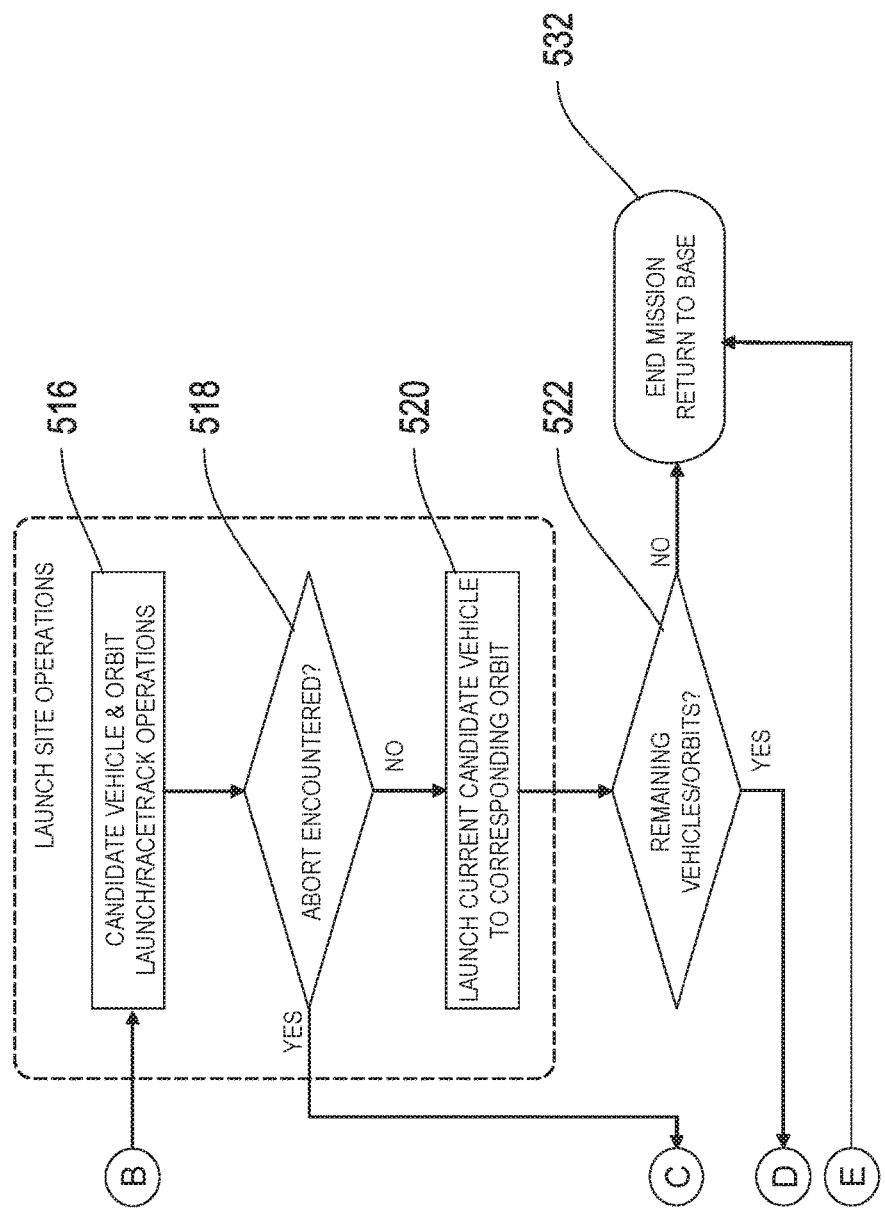

700

702
Receive information about a first launch site for launching a first satellite into orbit and a second launch site for launching a second satellite into orbit

704
Receive information about a launch vehicle configured to launch the first satellite and the second satellite into orbit

706
Receive an indication that the first launch site is not suitable for launching the first satellite into orbit

708
In response to the indication that the first launch site is not suitable for launching the first satellite into orbit, calculating, based on the received information about the launch vehicle, a third launch site for launching the first satellite into orbit

802
Receive an indication of a desired satellite constellation, wherein the desired satellite constellation comprises a first satellite traveling in a first orbit and a second satellite traveling in a second orbit, and wherein each of the first orbit and the second orbit comprise orbit parameters comprising at least: a semi-major axis, an inclination, and a longitude of an ascending node 804
Receive information about an accessible range of an aircraft configured to launch the first satellite into the first orbit and the second satellite into the second orbit 806
Calculate, based on the information about the accessible range of the aircraft, a geographical area that the aircraft can access without landing 808
Determine, based on the received information about the orbit parameters of the first orbit and the second orbit, a first launch site for launching the first satellite into the first orbit comprising a first geographical position and a first launch time, wherein the first launch site is within the calculated geographical area 810
Determine, based on the received information about the orbit parameters of the first orbit and the second orbit, a second launch site for launching the second satellite into the second orbit comprising a second geographical position and a second launch time, wherein the second launch site is within the calculated geographical area

FIG. 8

SYSTEMS AND METHODS FOR SATELLITE CONSTELLATION LAUNCH USING AIR-LAUNCHED VEHICLES

CROSS-REFERENCE TO RELATED APPLICATIONS

The present application is a continuation of U.S. patent application Ser. No. 16/042,606, filed Jul. 23, 2018, and issuing as U.S. Pat. No. 10,752,383 on Aug. 25, 2020, which is a continuation of U.S. patent application Ser. No. 14/788,214, filed Jun. 30, 2015, now U.S. Pat. No. 10,029,806 issued on Jul. 24, 2018, which claims the benefit of U.S. Provisional Application No. 62/151,969, filed Apr. 23, 2015, which are incorporated herein in their entirety by reference.

BACKGROUND

Satellites are often launched and operated in groups called "constellations." A satellite constellation typically comprises two or more satellites flown in coordinated orbits and directed towards a common task or goal. For example, communication satellites may be launched into separate orbits in order to optimize ground coverage throughout the day. However, due to the relatively high price of conventional rocket-based launches, a satellite constellation can be expensive to establish. The specific orbit requirements of the satellite constellation may require dedicated ground launches from several different vehicles and/or launch sites, increasing both risk and cost.

Furthermore, the relatively high costs of manufacturing, launching, and operating large traditional satellites have driven an emerging new market segment for constellations of smaller, cheaper satellites, often referred to as "smallsats" or "microsatellites." These smallsats are typically launched, either individually or in bulk, as a secondary payload on traditional rocket-based launch vehicles. However, this poses several problems. For instance, rocket-based launch vehicles can typically only access a narrow range of potential orbits (e.g., limited by one inclination and longitude of the ascending node), and smallsats may not have adequate propellant to generate the velocity change (i.e., .DELTA.v) necessary to maneuver themselves into the desired orbits.

SUMMARY

Systems and methods are described herein for launching a satellite constellation using air-launched vehicles. The air-launched vehicle, such as a carrier airplane, can rapidly inject all or part of a constellation satellite into orbit(s) within a short period of time. Launching two or more launch vehicles per carrier aircraft flight can significantly enhance the flexibility, responsiveness, and cost-competitiveness of an air-launch approach. Compared with other satellite injection techniques, such as rideshare opportunities aboard larger vehicles or the use of unproven, single-ride injection aboard smaller vehicles, the advantages are clear. Payload operators seeking to initiate or replenish constellations may be able to do so using a single-shot launch system at a relatively low price per satellite, rather than waiting months or years for a series of conventional rocket-based launches to become available.

The systems and methods described herein are described in relation to a carrier aircraft or airplane which acts as a platform for launching one or more rocket-powered launch vehicles. It will be understood by those of skill in the art that other types and combinations of carrier vehicles and launch vehicles may be utilized with the systems and methods described herein. For instance, any one or more of the carrier vehicle or launch vehicles may be a rocket-powered launch vehicle or an air-launched launch vehicle. Such embodiments shall not depart from the scope of the present disclosure.

According to one aspect, a method for calculating launch sites for a satellite constellation is provided. Processing circuitry and/or a hardware processor may receive an indication of a desired satellite constellation, wherein the desired satellite constellation comprises a first satellite traveling in a first orbit and a second satellite traveling in a second orbit. The first orbit may be different than the second orbit. Each of the first and the second orbit may comprise one or more orbit parameters, including at least a semi-major axis, an inclination, and a longitude of an ascending node. The first and the second orbit may each also comprise one or more additional orbit parameters as will be appreciated by one of skill in the art. Such orbit parameters may include, for instance, eccentricity of orbit, radius of perigee, radius of apogee, argument of perigee, and time of perigee passage. A carrier aircraft may be configured to launch the first satellite into the first orbit and the second satellite into the second orbit. In some embodiments, the processing circuitry may receive information about an accessible range of the aircraft. The received information about the accessible range of the aircraft may comprise, for example, a fuel capacity of the aircraft, a maximum speed of the aircraft, a cruising speed of the aircraft, a cruising altitude of the aircraft, or a cargo capacity of the aircraft. Based on the received information, the processing circuitry may calculate a geographical area that the aircraft can access without landing. For example, the processing circuitry may calculate the geographical area based on information about weather conditions within the geographical area, wind conditions within the geographical area, altitude within the geographical area, and accessible airports within the geographical area. Using this information, and the information about the orbit parameters of the first orbit and the second orbit, the processing circuitry may calculate a first launch site for launching the first satellite into the first orbit and a second launch site for launching the second satellite into the second orbit. The first launch site may comprise a first geographical position and a first launch time, and the second launch site may comprise a second geographical position and a second launch time. Both the first launch site and the second launch site may be within the calculated geographical area. In some embodiments, the processing circuitry may calculate a time that the aircraft can maintain flight without landing, and wherein a time period between the first launch time and the second launch time is less than the calculated time that the aircraft can maintain flight without landing.

In some embodiments, the processing circuitry may calculate, based on the received information about the orbit parameters of the first orbit, a third launch site for launching the first satellite into the first orbit comprising a third geographical position and a third launch time, wherein the third launch site is different from the first launch site. This third launch site may serve as a backup launch site in case the first launch site becomes unsuitable for launching the first satellite into the first orbit. In some embodiments, the processing circuitry may calculate the third launch site in response to a determination that the first launch site is not suitable or unavailable for launching the first satellite into the first orbit. The third launch site may be within the calculated geographical area, allowing the carrier aircraft to access the launch site without landing. In some embodiments, the third launch site may be outside the calculated geographical area. In such embodiments, the carrier aircraft may have to refuel and/or land in order to access the third launch site and launch the first satellite into the first orbit, and the processing may generate a notification and/or alert that the first satellite may not be launched into the first orbit without first refueling and/or landing the carrier aircraft.

In some embodiments, the first satellite and the second satellite may be carried on separate launch vehicles and mounted onto the carrier aircraft. For example, the launch vehicle may comprise a smaller, rocket-powered vehicle that may be mounted and deployed from the carrier aircraft once the carrier aircraft achieves the suitable condition(s) for launch. The first and second satellites may be mounted on any suitable launch vehicle and/or combination of launch vehicles in order to achieve their respective desired orbit parameters.

According to another aspect, processing circuitry may calculate launch sites for a satellite constellation in response to changes in the status of the mission and/or launch sites. For example, the processing circuitry may calculate/recalculate launch sites in substantially real-time while the carrier aircraft is in flight in response to changes in the availability or suitability of the launch sites. In some embodiments, the processing circuitry may determine a first geographical area that the carrier aircraft can access without landing. As discussed above, the aircraft may be configured to launch a first satellite into a first orbit and a second satellite into a second orbit using any suitable means, including through the use of secondary launch vehicles, such as rocket-powered launch vehicles. The processing circuitry may calculate a first launch site for launching the first satellite into the first orbit and a second launch site for launching the second satellite into the second orbit, wherein the first launch site comprises a first geographical position within the first geographical area and a first launch time, and wherein the second launch site comprises a second geographical position within the first geographical area and a second launch time. Subsequent to calculating the first launch site and the second launch site, the processing circuitry may receive information about an accessible range of the aircraft. Based on the received information, the processing circuitry may calculate a second geographical area that the aircraft can access without landing and may determine that the first launch site is not suitable for launching the first satellite into the first orbit. As an illustrative example, changes in the weather may make it difficult or impossible for the aircraft to access certain locations and may restrict its accessible range. In response to the indication that the first launch site is not suitable for launching the first satellite into the first orbit, the processing circuitry may calculate a third launch site for launching the first satellite into the first orbit, wherein the third launch site comprises a third geographical position within the second geographical area and a third launch time.

In some embodiments, the processing circuitry may determine that the first launch site is not suitable for launching the first satellite into the first orbit by receiving a signal that indicates that the first launch site is not suitable for launching the first satellite into the first orbit. The signal may come from any suitable source, such as a remote server or mission control that is monitoring the conditions of the surrounding area. In some embodiments, the processing circuitry may determine that the first launch site is not suitable for launching the first satellite into the first orbit by determining that the first launch site is not within the second geographical area. The processing circuitry may further calculate a time that the aircraft can maintain flight without landing, and wherein a time period between the second launch time and the third launch time is less than the calculated time that the aircraft can maintain flight without landing. In some embodiments, the processing circuitry may transmit a query, for instance to a remote server, requesting information about an accessible range of the aircraft.

BRIEF DESCRIPTION OF THE DRAWINGS

FIG. 1 shows two exemplary embodiments of air-launched launch vehicles mounted on a single carrier aircraft;

FIGS. 5A-C shows an illustrative block diagram of a satellite constellation launch process;

FIG. 7 shows another flow diagram of illustrative steps for calculating launch sites for a satellite constellation.

FIG. 8 shows another flow diagram of illustrative steps for calculating launch sites for a satellite constellation.

DETAILED DESCRIPTION

Figure 2:
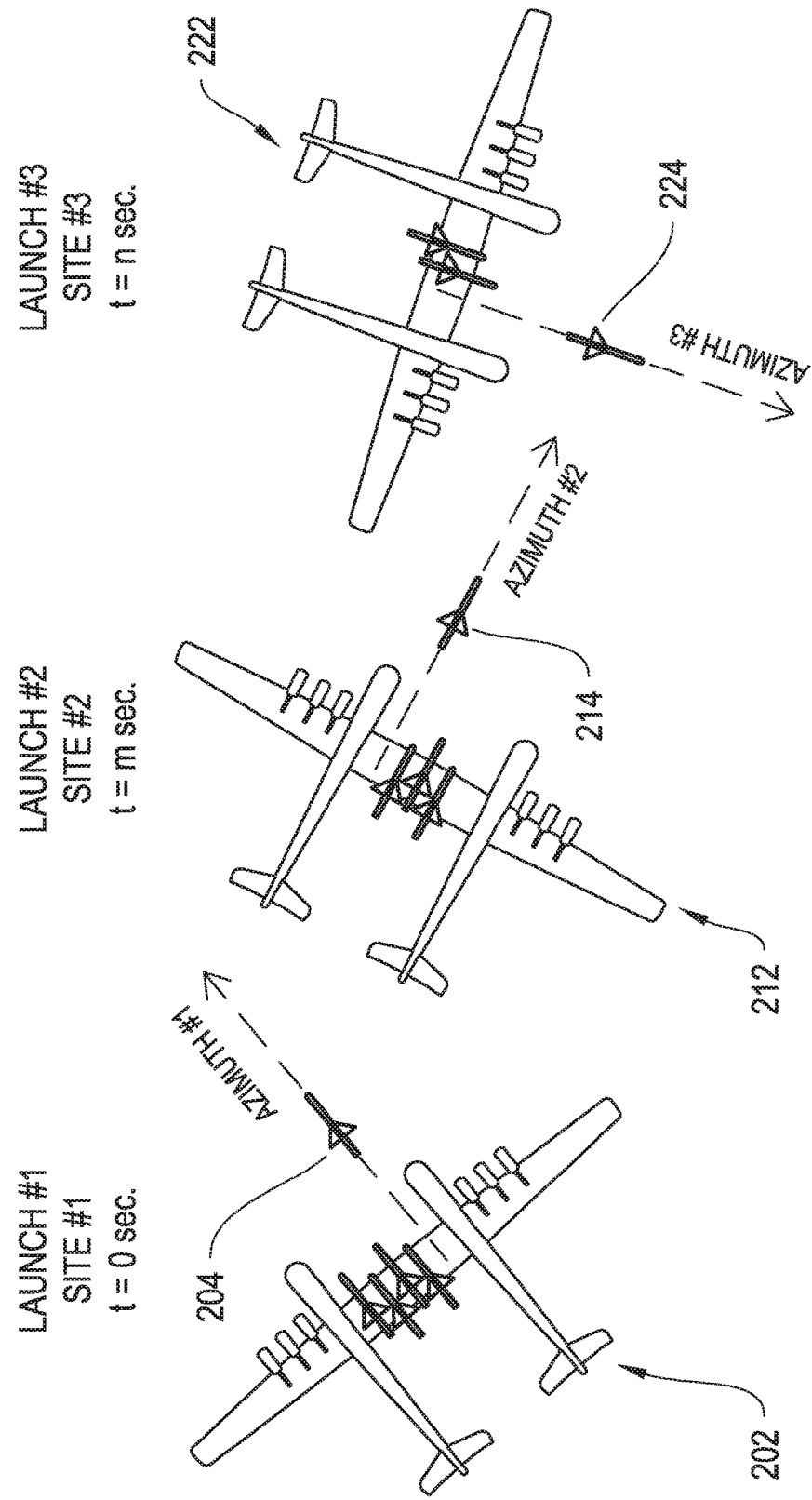
FIG. 2 shows an illustrative diagram of a launch sequence for a satellite constellation.

To provide an overall understanding of the systems and methods described herein, certain illustrative embodiments will now be described. However, it will be understood by one of ordinary skill in the art that the systems and methods described herein can be adapted and modified for other suitable applications and that such other additions and modifications will not depart from the scope hereof.

Systems and methods are described herein for launching a satellite constellation using air-launched vehicles and for calculating launch sites for a satellite constellation. The systems and methods described herein provide a novel, rapid, and flexible launch strategy aimed at completing injection of satellite constellations or other payload classes rapidly, by way of multiple deployments of two or more air-launched vehicles affixed onto or within a capable carrier aircraft. Each air-launched launch vehicle may be capable of inserting a satellite into a specified orbit with desired orbit parameters. This approach may have a number of advantages:

The ability to bulk-launch multiple vehicles from one carrier aircraft, thereby injecting payloads more rapidly than conventional ground-launched, rocket-based launch vehicles.

The ability to adjust deployment site coordinates as well as launch time both before and between vehicle deployments, affording the system great flexibility to target various orbital targets in all six degrees of freedom.

The ability to launch from any capable airport so as to reach a multitude of geographic locations suitable to meet the required launch site adjustments above.

The ability to launch said air-launched vehicles at differential azimuths and times to achieve desired orbital parameters of a satellite constellation mission or otherwise.

The ability to complete an injection to a total satellite constellation with global coverage within a day or less.

Satellite constellations, satellite constellation launch systems, and their features are described in greater detail in the following U.S. and foreign patent documents, which are hereby incorporated by reference herein in their entireties: U.S. Pat. No. 8,113,101, filed Sep. 19, 2011, U.S. Patent App. Publication No. 2003/0080241, filed Sep. 26, 2002, U.S. Pat. No. 8,020,482, filed Dec. 13, 2010, U.S. Pat. No. 6,119,985, filed Mar. 7, 1997, PCT App. No. 2007/058721, filed Oct. 12, 2006, U.S. Pat. No. 7,255,308, filed Mar. 23, 2005, PCT App. No. 2003/061141, filed Dec. 20, 2002, U.S. Pat. No. 7,198,230, filed Oct. 14, 1997, U.S. Patent App. Publication No. 20140240497, filed Jun. 20, 2013, and German Patent No. 19893921520, filed Jun. 30, 1989.

FIG. 1 shows two exemplary embodiments 100 of air-launched launch vehicles mounted on a single carrier aircraft. The launch vehicles 104 are mounted on aircraft 102, and the launch vehicles 108 are mounted on aircraft 106. The air-launched launch vehicles 104 and 108 may comprise any suitable launch vehicle for inserting a satellite into orbit, including, but not limited to, a missile, an ICBM, a rocket-based launch vehicle, or any other suitable launch vehicle. The carrier aircraft 102 and 106 may be any suitable aircraft for carrying the air-launched launch vehicles and is not limited to any particular carrier aircraft, mounting scheme, or air-launched vehicle. Although the illustrative aircraft in FIG. 1 are depicted with air-launched vehicles 104 and 108 mounted horizontally under the wing, other mounting configurations and orientations may be contemplated without departing from the scope thereof. For instance, the air-launched launch vehicles 104 and 108 may be mounted on the dorsal side of a carrier aircraft or oriented vertically with respect to the direction of travel of the carrier aircraft 102 and 106.

When considering back-to-back launches of the air-launched vehicles 104 and 108 using aircraft that can carry two or more launch vehicles, the launchers may access several different orbits with different combinations of orbit parameters, including semi-major axis/altitude, eccentricity, radius of perigee, radius of apogee, inclination, argument of perigee, longitude of the ascending node (.OMEGA.), and time of perigee passage. Analysis of these required combinations as well as the time required between launch vehicle deployments produces both sets of geographic launch vehicle deployment sites and/or a set of azimuths and times at which to deploy the vehicles 104 and 108.

FIG. 2 shows an illustrative diagram of a launch sequence 200 for a satellite constellation. Launch sequence 200 depicts a series of three launches, each launch separated by a period of time. Launch #1 depicts carrier aircraft 202 deploying the launch vehicle 204 towards a first azimuth direction, Launch #2 depicts carrier aircraft 212 deploying the launch vehicle 214 towards a second azimuth direction, and Launch #3 depicts carrier aircraft 222 deploying the launch vehicle 224 towards a third azimuth direction. It will be understood that launch sequence 200 is provided for illustrative purposes only, and that the launch sequence may include any number of suitable launches into any number of suitable velocity azimuths.

As depicted in FIG. 2, the carrier aircraft 202 may travel to a first geographic launch site and maneuver into a desired azimuth direction. The first air-launched launch vehicle 204 may be launched in the desired azimuth direction at t=0, thereby inserting a first satellite into a desired orbit. In some embodiments, the first air-launched launch vehicle 204 may insert two or more satellites into a desired orbit or orbits. For instance, a cluster of satellites may be packed onto the first air-launched launch vehicle and deployed together. The carrier aircraft 204 may then travel to a second geographic launch site and move into another desired azimuth direction. At the second launch site, the carrier aircraft 212 may launch a second launch vehicle 214 in the desired azimuth direction, thereby inserting a second satellite of the constellation in a second orbit. The second launch may happen at a desired time t=m seconds after the first launch. The carrier aircraft 212 may then travel to a third geographic launch site and maneuver into another desired velocity azimuth. At the third launch site, the carrier aircraft 222 may launch a third launch vehicle 224 in the desired azimuth direction, thereby inserting a third satellite of the constellation in a third orbit. Although the launch sequence is described above as involving a single carrier aircraft, it will be understood that aircraft 202, 212, and 222 may be a combination of any number of aircraft in order to satisfy the desired launch conditions. As an illustrative example, aircraft 212 may be a different carrier aircraft that is launched from a different airport than aircraft 202 and 224. In this manner, aircraft 212 may maneuver to the desired geographic location and azimuth direction at the desired time, which may have been unaccessible by aircraft 202 and 224 due to physical limitations of the range or speed of the aircraft 202 and 224.

Figure 3:
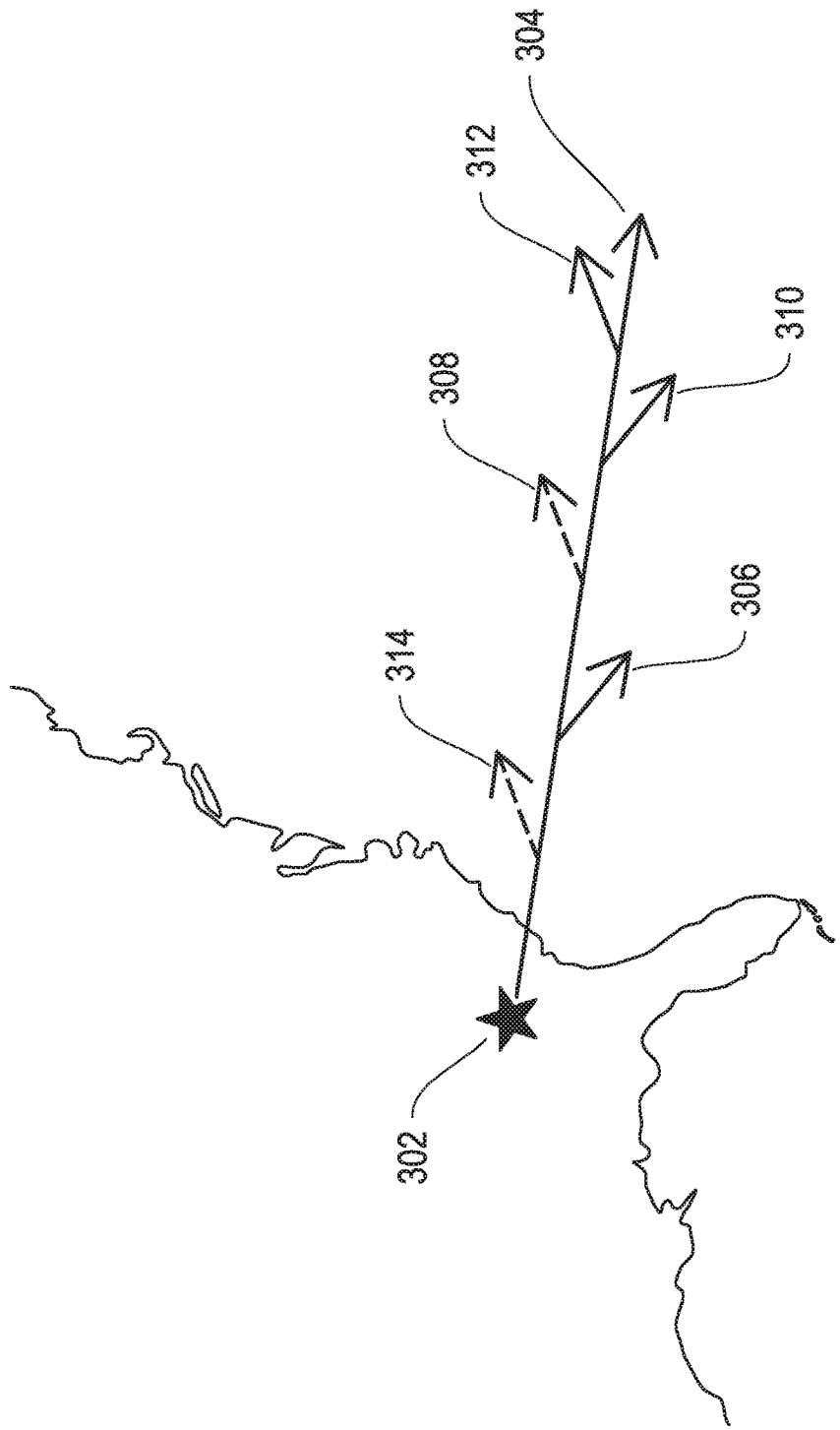
FIG. 3 shows an illustrative diagram of a flight path of a carrier aircraft and launch sites for a satellite constellation.

FIG. 3 shows an illustrative diagram of a flight path 300 of a carrier aircraft and launch sites for a satellite constellation. The flight path 300 comprises an airport 302, a carrier aircraft path 304, and launch sites 306, 308, 310, 312, and 314. It will be understood that the flight path 300 is provided for illustrative purposes only, and that the systems and methods described herein may be utilized with any suitable flight path and number of launch sites.

As depicted in FIG. 3, a carrier aircraft may take off from airport 302 and follow the carrier aircraft path 304. The carrier aircraft path 304 may be either a one-way path or a round-trip path. In the illustrative example depicted in FIG. 3, the carrier aircraft takes off from the United States of America, maneuvers into the Atlantic Ocean, and returns to the airport 302. Although only a single airport is depicted in FIG. 3, it will be understood that multiple airports may be utilized by the carrier aircraft path 304. For instance, the carrier aircraft may take off from a first airport and land at a second, different airport. The carrier aircraft may deploy launch vehicles at various locations along the carrier aircraft path 304. The launch vehicles may be deployed either on the outgoing leg, such as launch sites 306, 308, and 310, or on the return leg, such as launch sites 312 and 314. The launch sites 306, 308, 310, 312, and 314 depict illustrative launch locations and directions for the launch vehicles and are provided for illustrative purposes only. At each of the launch sites 306, 308, 310, 312, and 314, the carrier aircraft may maneuver itself into the appropriate orientation, as discussed above in FIG. 2, in order to deploy the launch vehicle in a suitable direction. The carrier aircraft may also maintain a presence around any one of the launch sites in order to deploy the launch vehicles at suitable times. For instance, the orbit characteristics of the satellite constellation may require a first launch from a first location at a first time and a second launch from the same location at a later time. In such cases, the carrier aircraft may maintain a presence at the location until the later launch. In some embodiments, the carrier aircraft may land at airport 302, or any other airport, in between launches at any of the launch sites 306, 308, 310, 312, and 314.

Figure 4:
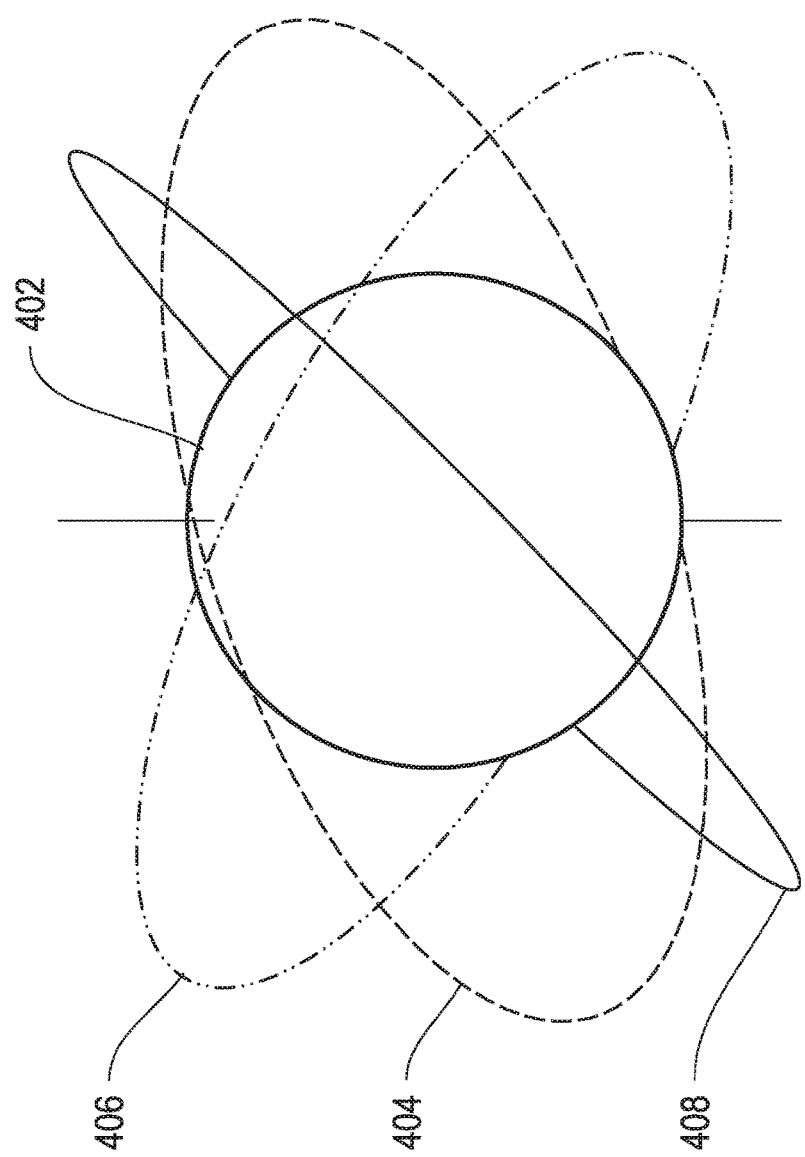
FIG. 4 shows an illustrative diagram of the orbits of a satellite constellation.

FIG. 4 shows an illustrative diagram 400 of the orbits of a satellite constellation. As discussed above, several satellites may be inserted into individual orbits by a single carrier aircraft. Each of the orbits 404, 406, and 408 may be defined by one or more orbit parameters, including, but not limited to, a semi-major axis, eccentricity, inclination, argument of perigee, longitude of the ascending node, time of perigee passage, radius of perigee, and radius of apogee. The celestial body 402 may be any suitable celestial body, including, but not limited to, the Earth, the moon, Mars, the sun, an asteroid, or any other planet, star, or celestial phenomenon. Each of the orbits 404, 406, and 408 may be established by respective launches from a carrier aircraft, as discussed above in FIGS. 1-3. In some embodiments, two or more of the orbits 404, 406, and 408 may be established by a single launch from a carrier aircraft. For example, the air-launched launch vehicle may carry two satellites as a payload, and one or both satellites may comprise thrusters that allow it to maneuver into one of the final orbits 404, 406, or 408.

As an illustrative example of a mission profile, a customer may wish to create a rapid surveillance constellation using a small satellite design, in which five 400 km circular orbits that are separated by .DELTA..OMEGA.=72.degree. and inclined at 45.degree. are each to be supplied with clusters of eight 22 kg satellites. This mission assumes: [0035] Five air-launched vehicles, each injecting a cluster of 375 kg including adapter mass [0036] Aircraft based at Kennedy Space Center-accessing launch sites to the east [0037] Racetrack Operations: Five launch sites, 3 along outbound leg and 2 along return leg The mission may be executed with the following timings: [0038] Launch #1 at t=1 hr after takeoff [0039] Launch #2 at t=2 hrs, 35 min after takeoff [0040] Launch #3 at t=5 hrs, 21 min after takeoff [0041] Launch #4 at t=6 hrs, 44 min after takeoff [0042] Launch #5 at t=12 hrs, 37 min after takeoff In this example the carrier aircraft has sufficient endurance to complete all five launches within the calculated geographical area and allotted time. In this manner, the carrier aircraft can insert the cluster of satellites into each of the five separate orbits in a relatively short amount of time. There are other scenarios in which the carrier aircraft may be required to return to base for refueling between launches.

Figure 5B:
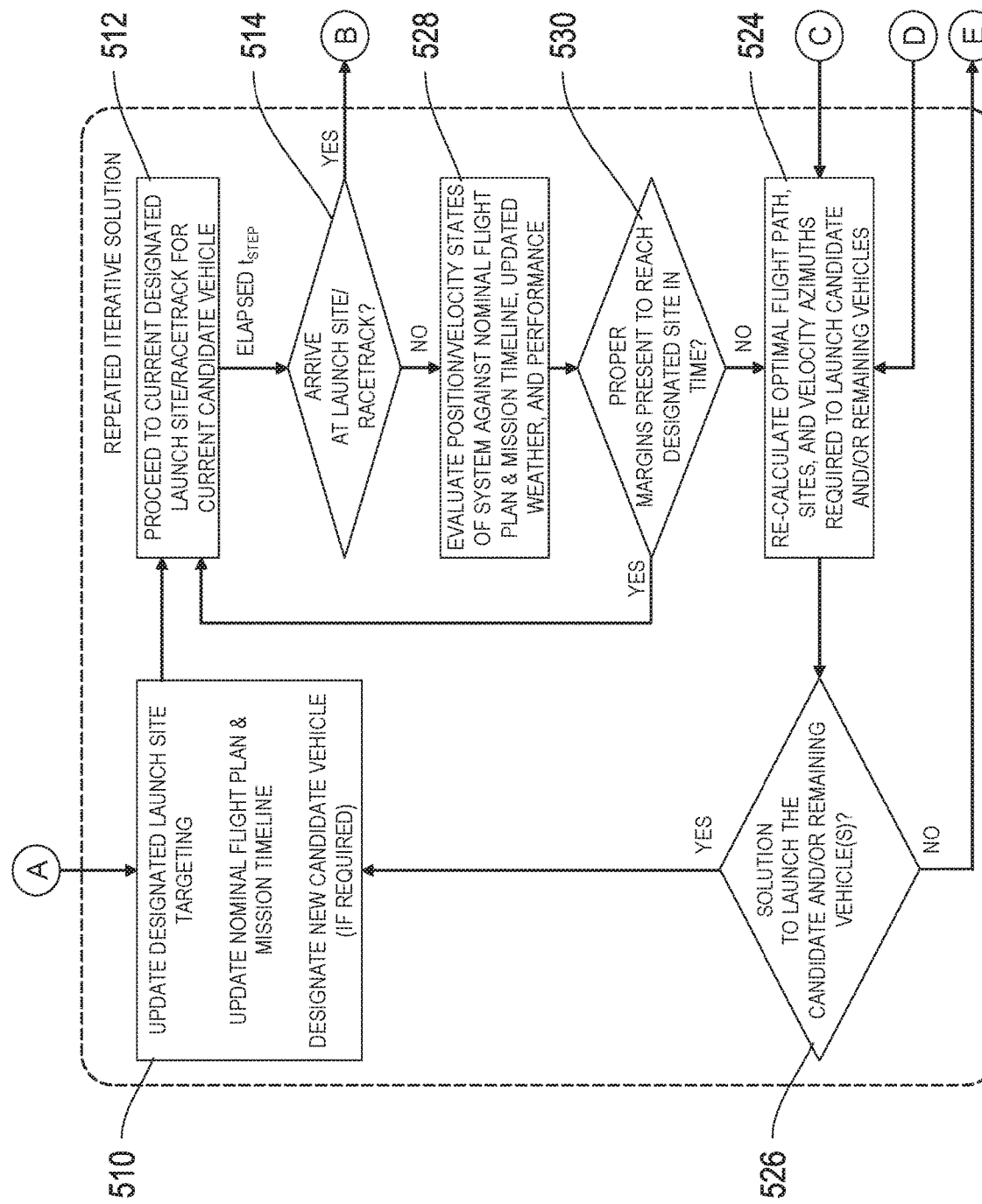

FIGS. 5A-C shows an illustrative block diagram 500 of a satellite constellation launch process. The process depicted in FIGS. 5A-C may be executed by any suitable processing circuitry, including a hardware processor(s) located on the carrier aircraft, at an airport or mission control, or both. The block diagram 500 includes starting a new mission launch procedure at step 502, receiving mission inputs at step 504, calculating the optimal flight path and launch sites at step 506, and monitoring and correcting the flight path and launch sites in the iterative process of steps 510, 512, 514, 528, 530, 524, and 526, launch site operations depicted by steps 516, 518, and 520, determining if remaining vehicles and or orbits are required at step 522, and ending the mission and returning to base at step 532.

At step 502, a new mission launch procedure may be initiated, either at an airport/mission control or on a carrier aircraft. At step 504, processing circuitry may receive mission inputs, such as target constellation orbital parameters, carrier aircraft parameters, launch vehicle count/parameters, airport location, and weather and wind forecast. Based on these inputs, the processing circuitry may calculate an optimal flight path, launch sites, timing, and velocity azimuths required to be achieved by the launch system for each of the desired orbits at step 506. The carrier aircraft may take off at step 508 and enter an iterative process during the mission depicted by steps 510, 512, 514, 528, 530, 524, and 526. During this iterative process, the processing circuitry may monitor and correct the flight path and launch sites in substantially real-time in response to various changes in mission parameters or environment. At step 510, the processing circuitry may update the designated launch site targeting, update the nominal flight plan or mission timeline, or designate a new candidate vehicle if required. At step 512, the carrier aircraft may proceed to the current designated launch site/racetrack for the current launch vehicle. At step 514, the processing circuitry may determine whether the carrier aircraft has arrived at the designated launch site/racetrack. The processing circuitry may determine that the carrier aircraft has arrived at the designated launch site/racetrack using any suitable mechanism. For example, the processing circuitry may receive input from the pilot or mission that the carrier aircraft has arrived at its designated launch site/racetrack or may receive GPS coordinates to determine proximity to the designated launch site/racetrack. If the processing circuitry determines that the carrier aircraft has arrived at the designated launch site/racetrack, the processing circuitry may enter launch site operations, depicted by steps 516, 518, and 520. At step 516, the carrier aircraft and/or launch vehicle may perform orbit launch/racetrack operations. For instance, the carrier aircraft may prepare the launch vehicle for deployment. At step 518, the processing circuitry may check for an abort. If an abort is not detected, the carrier aircraft may deploy the launch vehicle into the corresponding orbit at step 520. The processing circuitry may determine whether vehicles/orbits remain to be launched at step 522. If all of the vehicles have been deployed, then the carrier aircraft may end the mission and return to base at step 532.

If vehicles remain to be launched, then the processing circuitry may re-calculate the optimal flight path for the carrier aircraft, launch sites, and velocity azimuths for the remaining launch vehicles at step 524. At step 526, the processing circuitry may determine whether it is possible to launch the remaining vehicles. For instance, changes in the mission parameters (e.g., weather, carrier aircraft fuel margin) may have made it impossible to access the launch sites necessary to establish the remaining orbits of the satellite constellation. If this is the case, then the carrier aircraft may end the mission and return to base at step 532. If there exists a solution to launch the remaining vehicles, then the processing circuitry may return to step 510 and update the designated launch site targeting, update nominal flight plan and mission timeline, and designate a new launch vehicle (if required).

En route to a launch site, the processing circuitry may evaluate position/velocity states of the carrier aircraft against the nominal flight plan, mission timeline, updated weather, and mission performance at step 528. At step 530, the processing circuitry may determine whether the proper margins are present to reach the designated launch site in time. If the proper margin exists for reaching the designated launch site, then the processing circuitry may return to step 512. If the proper margins for reaching the designated launch site do not exist, the processing circuitry may re-calculate the optimal flight path, launch sites, and velocity azimuths to launch the remaining vehicles at step 524. In this manner, the processing circuitry iteratively monitors the mission progress and updates the launch sites and flight plan accordingly in response to various changes in mission parameters, conditions, and performance.

According to some aspects, an algorithm, run by processing circuitry such as a hardware processor(s), may be used to determine suitable launch sites, including, but not limited to, the orbit parameters of the desired satellite constellation, the characteristics of the carrier aircraft, and/or the current environmental conditions. In one embodiment, an algorithm may calculate suitable launch sites for inserting the satellites into the desired orbits before launching the carrier aircraft.

For example, the algorithm may take as inputs the orbit parameters of the desired satellite constellation, the characteristics of the carrier aircraft, and/or the current or expected environmental conditions at the time of the launches. Each desired orbit may be defined by one or more orbit parameters, which may include a semi-major axis, an altitude, an inclination, a longitude of the ascending node, an eccentricity, an argument of perigee, a radius of perigee, a radius of apogee, and a time of perigee passage. The algorithm may further receive information about an accessible range of the carrier aircraft. For instance, the algorithm may receive information about a fuel capacity of the aircraft, a maximum speed of the aircraft, a cruising speed of the aircraft, a cruising altitude of the aircraft, or a cargo capacity of the aircraft. Based on these characteristics, the algorithm may calculate the estimated range of the carrier aircraft. The algorithm may also calculate a geographical area that the aircraft can access without landing. In some embodiments, the geographical area that the aircraft can access without landing may be limited by the terrain, such as if there are mountains to navigate between. Environmental factors may also be taken into account when calculating the geographical area that the aircraft can access without landing. Expected weather conditions, such as temperature, wind, and humidity, may all affect the geographical area that the aircraft can access without landing. For example, major storms with significant winds may cause the algorithm to decrease the estimated geographical area of the aircraft in order to provide a greater margin of error or safety factor for the mission. In some embodiments, the algorithm may also estimate a maximum flight time of the aircraft based on any or all of the above factors. In some embodiments, certain flight paths may be restricted by regulatory agencies, such as the federal aviation administration (FAA). The algorithm may receive information about restricted air space or flight paths and calculate the geographical area that the aircraft can access based on the received information. The accessible geographical area and the maximum flight time of the aircraft may become key factors in determining launch sites and a mission profile for establishing the satellite constellation.

In some embodiments, the algorithm may calculate a first launch site for launching the first satellite into the first orbit comprising a first geographical position and a first launch time, and a second launch site for launching the second satellite into the second orbit comprising a second geographical position and a second launch time, wherein the first launch site and the second launch site are within the calculated geographical area. The first and second launch sites may be considered an "optimal" set of launch sites, based on desired mission parameters. For example, the mission may be designed to minimize flight time, minimize cost, and/or minimize risk of the mission, in addition to other considerations. Thus, the "optimal" set of launch sites may represent the first choice for launch based on the available information on the desired orbits, characteristics of the carrier aircraft, and current/expected weather conditions. The algorithm may also calculate one or more "secondary" sets of launch sites for establishing any of the desired orbits. These secondary launch sites may be equally suitable for inserting the satellites into the desired orbit, but may not optimize one or more mission parameters, such as time, cost, or risk. The secondary set of launch sites may thus be used as backup launch sites if the optimal launch sites become unavailable or unsuitable for launch. As an illustrative example, the optimal launch site may experience unexpected harsh weather conditions and become unsuitable for launch. Detecting this, the carrier aircraft may, either automatically or manually, divert to a secondary launch site to insert the satellite into the desired orbit. In some embodiments, the secondary launch may be at the same geographic location, but may be separated from the optimal launch by time. For instance, the first launch may not occur at the optimal time due to weather, but the carrier aircraft may still maintain a presence in the area in case the weather clears after a period of time and becomes suitable for launch.

In some embodiments, the optimal and secondary sets of launch sites may be calculated before the carrier aircraft takes off and is programmed into the flight plan. In such embodiments, if all of the optimal and secondary launch sites become unsuitable for launch, the carrier aircraft may be required to return to base in order to receive an updated mission plan. In other embodiments, the carrier aircraft may receive a signal mid-flight with an updated mission plan, including updated optimal and secondary launch sites. In some embodiments, the carrier aircraft may recalculate the optimal and secondary launch sites mid-flight. In these embodiments, the carrier aircraft may take into account a variety of factors, including the orbit parameters of the desired satellite constellation, the characteristics of the carrier aircraft, the current status of the carrier aircraft (e.g., fuel status, damage, flight time, etc.), sensor data, the current environmental conditions, and/or mission parameters. Based on any or all of the above-identified factors, the carrier aircraft may recalculate one or more launch sites for the satellites. The recalculation may occur on a periodic or continuous basis, and may occur over any suitable period of time, such as several times a second, every minute, or every hour. For example, the carrier aircraft may periodically calculate the optimal launch sites during flight and adjust the flight plan to account for updated optimal launch sites.

In some embodiments, the algorithm may determine that a launch site is not suitable for launching a satellite into orbit, and in response to the determination, the algorithm may calculate another suitable launch site. In some embodiments, the algorithm may receive an external signal, such as a signal sent from mission control to the carrier aircraft that indicates that the launch site is not suitable for launch. In some embodiments, the algorithm may itself determine that the launch site is not suitable. For instance, the algorithm may periodically update the estimated geographical range and remaining flight time of the carrier aircraft and determine that an optimal launch site no longer falls within the geographical range of the carrier aircraft. As another illustrative example, the algorithm may determine, based on a maximum or cruise speed of the carrier aircraft, that the estimated flight time remaining (e.g., based on the amount of fuel left) is not sufficient for the carrier aircraft to reach the optimal launch site and return to base.

Figure 6:
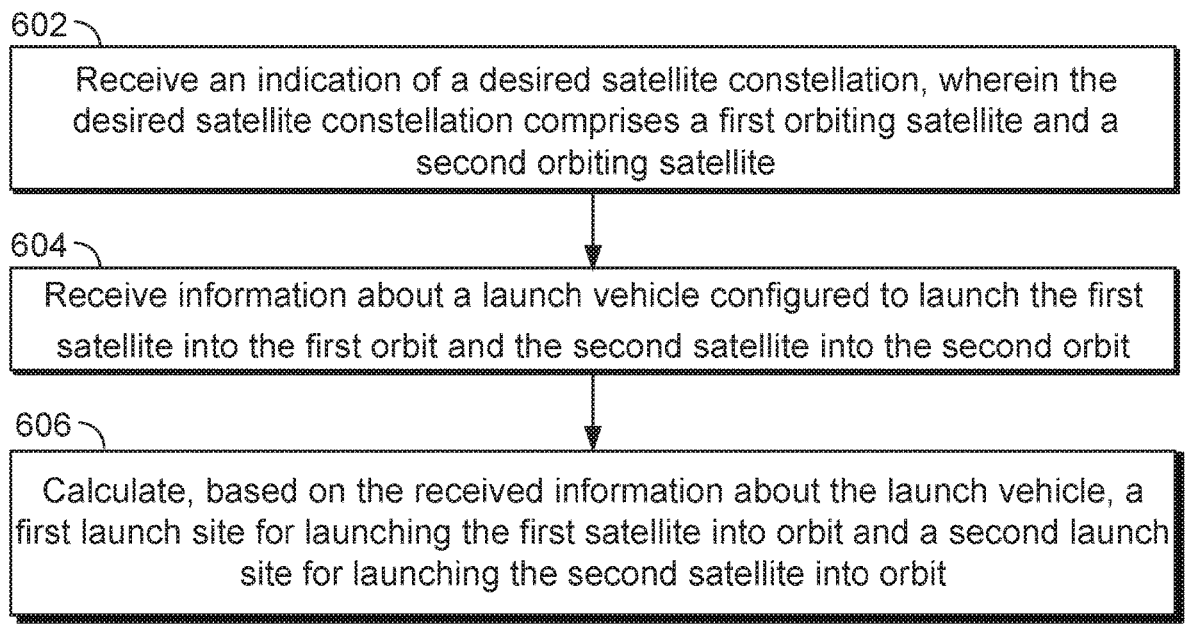
FIG. 6 shows a flow diagram of illustrative steps for calculating launch sites for a satellite constellation.

FIG. 6 shows a flow diagram 600 of illustrative steps for calculating launch sites for a satellite constellation. Diagram 600 comprises receiving an indication of a desired satellite constellation, wherein the desired satellite constellation comprises a first orbiting satellite and a second orbiting satellite at step 602, receiving information about a launch vehicle configured to launch the first satellite into the first orbit and the second satellite into the second orbit at step 604, and calculating, based on the received information about the launch vehicle, a first launch site for launching the first satellite into orbit and a second launch site for launching the second satellite into orbit at step 606.

At step 602, processing circuitry may receive an indication of a desired satellite constellation, wherein the desired satellite constellation comprises a first orbiting satellite and a second orbiting satellite. For example, the processing circuitry may take as inputs the orbit parameters of the desired satellite constellation, each orbit defined by one or more orbit parameters, which may include a semi-major axis, an altitude, an inclination, a longitude of the ascending node, an eccentricity, an argument of perigee, a radius of perigee, a radius of apogee, and a time of perigee passage. At step 604, the processing circuitry may receive information about a launch vehicle configured to launch the first satellite into the first orbit and the second satellite into the second orbit. In some embodiments, the launch vehicle may be a carrier aircraft designed to carry further air-launched launch vehicles which contain the satellites for insertion into orbit. For instance, the algorithm may receive information about a fuel capacity of the aircraft, a maximum speed of the aircraft, a cruising speed of the aircraft, a cruising altitude of the aircraft, or a cargo capacity of the aircraft. At step 606, the processing circuitry may calculate, based on the received information about the launch vehicle, a first launch site for launching the first satellite into orbit and a second launch site for launching the second satellite into orbit. In some embodiments, the processing circuitry may take into account additional information when calculating the launch sites, including, for instance, the current and/or forecasted environmental conditions in the surrounding area.

FIG. 7 shows a flow diagram 700 of illustrative steps for calculating launch sites for a satellite constellation. Diagram 700 comprises receiving information about a first launch site for launching a first satellite into orbit and a second launch site for launching a second satellite into orbit at step 702, receiving information about a launch vehicle configured to launch the first satellite and the second satellite into orbit at step 704, receiving an indication that the first launch site is not suitable for launching the first satellite into orbit at step 706, and in response to the indication that the first launch site is not suitable for launching the first satellite into orbit, calculating, based on the received information about the launch vehicle, a third launch site for launching the first satellite into orbit at step 708.

At step 702, processing circuitry may receive information about a first launch site for launching a first satellite into orbit and a second launch site for launching a second satellite into orbit. For example, the first and second launch site may have been pre-calculated before the carrier aircraft takes off. Information about the first and second launch sites may include, for instance, geographic locations and time to deploy air-launched launch vehicles that contain satellites for insertion into orbit. At step 704, the processing circuitry may receive information about a launch vehicle configured to launch the first satellite and the second satellite into orbit. Step 704 may be substantially similar to step 604 described above in relation to FIG. 6.

At step 706, the processing circuitry may receive an indication that the first launch site is not suitable for launching the first satellite into orbit. As discussed above, the launch site may become not suitable for launching the first satellite for any number of reasons including, for instance, harsh weather or inability to reach the desired launch site. In some embodiments, the processing circuitry may receive an external signal, such as a signal sent from mission control, that indicates that the launch site is not suitable for launch. In some embodiments, the processing circuitry may itself determine that the launch site is not suitable. For instance, the processing circuitry may periodically update the estimated geographical range and remaining flight time of the carrier aircraft and determine that an optimal launch site no longer falls within the geographical range of the carrier aircraft. As another illustrative example, the processing circuitry may determine, based on a maximum or cruise speed of the carrier aircraft, that the estimated flight time remaining (e.g., based on the amount of fuel left) is not sufficient for the carrier aircraft to reach the optimal launch site and return to an airport.

At step 708, in response to the indication that the first launch site is not suitable for launching the first satellite into orbit, the processing circuitry may calculate, based on the received information about the launch vehicle, a third launch site for launching the first satellite into orbit. As discussed above, the third launch site may become a backup launch site for launching the first satellite into orbit. In some embodiments, the processing circuitry may further determine whether it is physically possible, based on the range and speed of the carrier aircraft, to reach the third launch site in time to perform the desired launch. If it is not possible to reach the third launch site in time to perform the desired launch, the processing circuitry may terminate the launch and either proceed to the next launch or return to base/mission control.

FIG. 8 shows a flow diagram 800 of illustrative steps for calculating launch sites for a satellite constellation. Diagram 800 comprises receiving an indication of a desired satellite constellation, wherein the desired satellite constellation comprises a first satellite traveling in a first orbit and a second satellite traveling in a second orbit, and wherein each of the first orbit and the second orbit comprise orbit parameters comprising at least: a semi-major axis, an inclination, and a longitude of an ascending node at step 802, receiving information about an accessible range of an aircraft configured to launch the first satellite into the first orbit and the second satellite into the second orbit at step 804, calculating, based on the information about the accessible range of the aircraft, a geographical area that the aircraft can access without landing at step 806, determining, based on the received information about the orbit parameters of the first orbit and the second orbit a first launch site for launching the first satellite into the first orbit comprising a first geographical position and a first launch time at step 808, and determining, based on the received information about the orbit parameters about the first orbit and the second orbit, a second launch site for launching the second satellite into the second orbit comprising a second geographical position and a second launch time, wherein the first launch site and the second launch site are within the calculated geographical area at step 810.

As discussed above in relation to FIGS. 6-7, processing circuitry may receive an indication of a desired satellite constellation, wherein the satellite constellation comprises a first satellite traveling in a first orbit and a second satellite traveling in a second orbit. As discussed above in relation to FIGS. 5A-C, each orbit may be defined by one or more orbit parameters, including, but not limited to, a semi-major axis, an inclination, and a longitude of an ascending node. At step 804, processing circuitry may receive information about an accessible range of an aircraft configured to launch the first satellite into the first orbit and the second satellite into the second orbit. Step 804 may be substantially similar to step 704 described above in relation to FIG. 7. At step 806, the processing circuitry may calculate, based on the information about the accessible range of the aircraft, a geographical area that the aircraft can access without landing. In some embodiments, the geographical area may represent the area of where potential launches may occur without landing the carrier aircraft.

At step 808, the processing circuitry may determine, based on the received information about the orbit parameters of the first orbit and the second orbit a first launch site for launching the first satellite into the first orbit comprising a first geographical position and a first launch time. The first geographical position may be within the calculated geographical area such that the aircraft can reach the first geographical position without landing. At step 810, the processing circuitry may also determine, based on the received information about the orbit parameters about the first orbit and the second orbit, a second launch site for launching the second satellite into the second orbit comprising a second geographical position and a second launch time. The second geographical position may be within the calculated geographical area such that the aircraft can reach the second geographical position without landing. The time difference between the first launch time and the second launch time may also be less than a travel time required by the aircraft to travel between the first geographical position and the second geographical position. In this manner, launch sites for two or more air-launched launch vehicles may be calculated such that the launch sites may be reached by a single carrier aircraft without landing and/or refueling the carrier aircraft.

Figure 9:
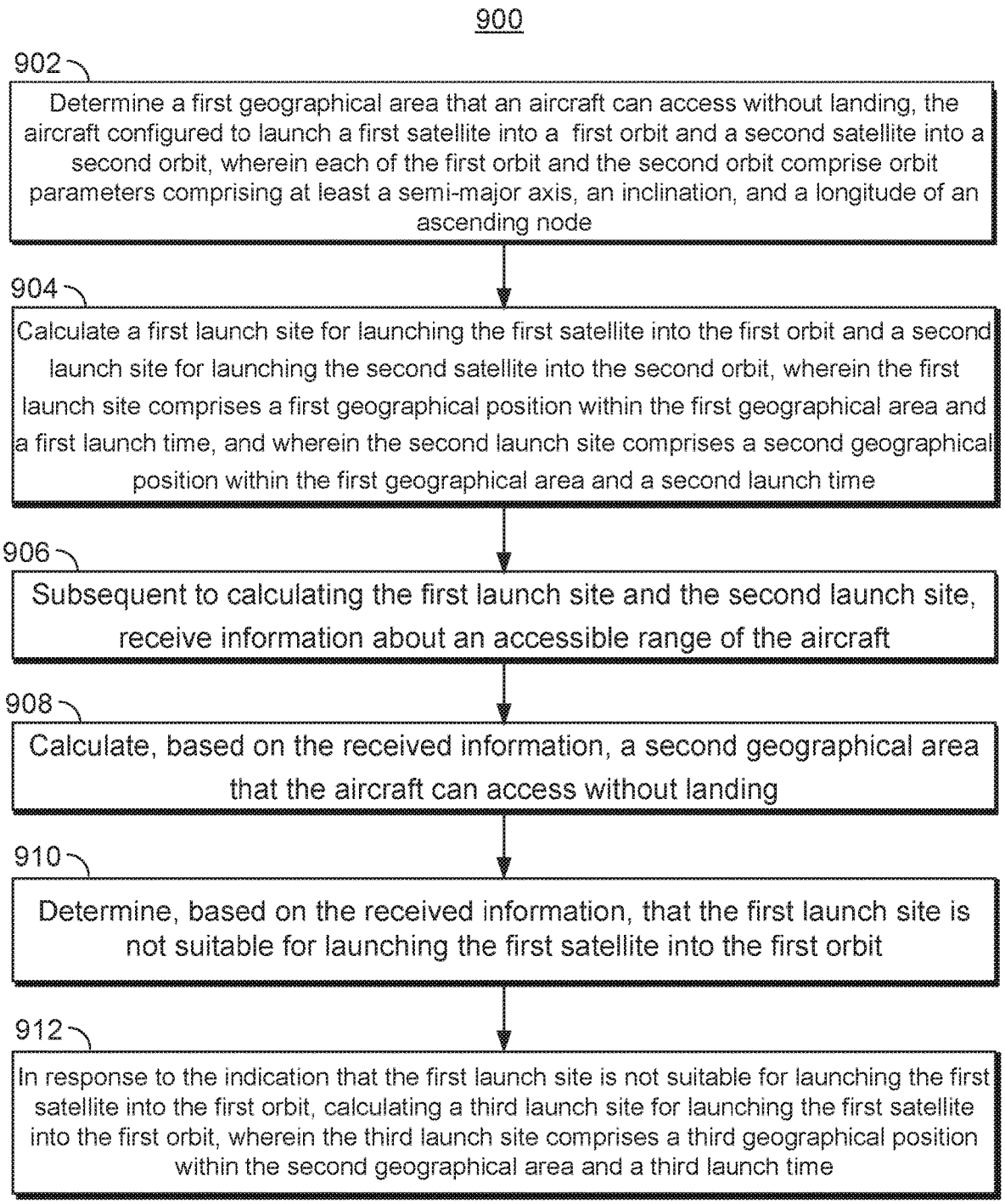
FIG. 9 shows another flow diagram of illustrative steps for calculating launch sites for a satellite constellation.

FIG. 9 shows a flow diagram 900 of illustrative steps for calculating launch sites for a satellite constellation. Diagram 900 includes determining a first geographical area that an aircraft can access without landing, the aircraft configured to launch a first satellite into a first orbit and a second satellite into a second orbit, wherein each of the first orbit and the second orbit comprise orbit parameters comprising at least a semi-major axis, an inclination, and a longitude of an ascending node at step 902, calculating a first launch site for launching the first satellite into the first orbit and a second launch site for launching the second satellite into the second orbit, wherein the first launch site comprises a first geographical position within the first geographical area and a first launch time, and wherein the second launch site comprises a second geographical position within the first geographical area and a second launch time at step 904, subsequent to calculating the first launch site and the second launch site, receiving information about an accessible range of the aircraft at step 906, calculating, based on the received information, a second geographical area that the aircraft can access without landing at step 908, determining, based on the received information, that the first launch site is not suitable for launching the first satellite into the first orbit at step 910, and in response to the indication that the first launch site is not suitable for launching the first satellite into the first orbit, calculating a third launch site for launching the first satellite into the first orbit, wherein the third launch site comprises a third geographical position within the second geographical area and a third launch time at step 912.

At step 902, processing circuitry may determine a first geographical area that an aircraft can access without landing, the aircraft configured to launch a first satellite into a first orbit and a second satellite into a second orbit, wherein each of the first orbit and the second orbit comprise orbit parameters comprising at least a semi-major axis, an inclination, and a longitude of an ascending node. Step 902 may be substantially similar to step 806 described above in relation with FIG. 8. At step 904, the processing circuitry may calculate a first launch site for launching the first satellite into the first orbit and a second launch site for launching the second satellite into the second orbit, wherein the first launch site comprises a first geographical position within the first geographical area and a first launch time, and wherein the second launch site comprises a second geographical position within the first geographical area and a second launch time. Step 904 may be substantially similar to steps 808 and 810 described in relation with FIG. 8.

At step 906, the processing circuitry may, subsequent to calculating the first launch site and the second launch site, receive information about an accessible range of the aircraft. The information about the accessible range of the aircraft may indicate an accessible range that is different than the first geographical area. As discussed above, the accessible range of an aircraft may change during a mission as a result of any number of factors, including, for instance, weather, terrain, flight plan restrictions, and fuel consumption. The processing circuitry may receive the information about an accessible range of the aircraft in any suitable manner. For instance, the processing circuitry may receive a signal from a remote source that indicates the accessible range of the aircraft. The processing circuitry may also calculate the information about the accessible range of the aircraft and/or retrieve such information from local memory. At step 908, the processing circuitry may calculate, based on the received information, a second geographical area that the aircraft can access without landing at step 908. The second geographical area may be different than the first geographical area.

At step 910, the processing circuitry may determine, based on the received information, that the first launch site is not suitable for launching the first satellite into the first orbit. As discussed above, the processing circuitry may make this determination in any suitable manner, including receiving a signal from a remote source that the first launch site is not suitable for launching the first satellite into the first orbit, or determining that the first launch site is not within the second geographical area. At step 912, the processing circuitry may, in response to determining that the first launch site is not suitable for launching the first satellite into the first orbit, calculate a third launch site for launching the first satellite into the first orbit, wherein the third launch site comprises a third geographical position within the second geographical area and a third launch time. As discussed above, the third launch site may be a "backup" launch site for launching the first satellite into the first orbit. The third launch site may be within the second geographical area, such that the aircraft may access the second geographical area without landing. In some embodiments, the third launch site may comprise the same geographical position as the first launch site and a launch time that is later than the first launch time.

It will be understood by those of skill in the art that the systems and methods described herein may be implemented using a conventional general purpose digital computer or server. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium having instructions stored thereon/in and, when executed, e.g., by a processor, perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks, optical disks, DVDs, CD-ROMs, micro-drives, and magneto-optical disks, ROMs, RAMs, EPROMs, EEPROMs, DRAMs, VRAMs, flash memory devices including flash cards, magnetic or optical cards, nanosystems including molecular memory ICs, RAID devices, remote data storage/archive/warehousing, or any other type of media or device suitable for storing instructions and/or data thereon/in.

Additionally, the systems and methods described herein may be applied to any storage application that includes data set copies which are to be synchronized. These systems can work with any storage medium, including discs, RAM, and hybrid systems that store data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein. The term "storage system" should, therefore, be taken broadly to include such arrangements.

Stored on any one of the computer readable medium, some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming software of the general-purpose/specialized computer or microprocessor are software modules for implementing some embodiments.

It will be apparent to those skilled in the art that such embodiments are provided by way of example only. It should be understood that numerous variations, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. A satellite constellation launch system comprising:
    a carrier aircraft; and
    a plurality of rocket-powered launch vehicles including a first satellite launch vehicle and a second satellite launch vehicle mounted to the carrier aircraft;
    wherein the carrier aircraft is configured to carry the first satellite launch vehicle to a first aerial launch site for launching the first satellite from the aircraft into a first orbit, the first aerial launch site comprising a first geographical position and a first launch time, the first geographical position within a geographical area that the aircraft and the mounted first satellite launch vehicle and second satellite launch vehicle can access without landing;
    wherein the carrier aircraft is configured to carry the second satellite launch vehicle to a second aerial launch site for launching the second satellite from the aircraft into a second orbit, the second aerial launch site comprising a second geographical position and a second launch time, the second geographical position within the geographical area that the aircraft can access without landing and wherein the second aerial launch site is determined using mission parameters indicating flight conditions for the aircraft and launch conditions of launch of the first satellite at the first aerial launch site.

2. The satellite constellation launch system of claim 1, wherein the carrier aircraft is a dual fuselage aircraft and wherein the plurality of rocket-powered launch vehicles are mounted on a center wing portion of the dual fuselage aircraft.

3. The satellite constellation launch system of claim 1, wherein a time period between the first launch time and the second launch time is less than the calculated time that the aircraft can maintain flight without landing.

4. The satellite constellation launch system of claim 1, wherein the geographical area that the aircraft and the mounted first satellite launch vehicle and second satellite launch vehicle can access without landing is based on based one or more of weather conditions within the geographical area, wind conditions within the geographical area, flight altitude within the geographical area, flight plan or terrain restrictions within the geographical area, and accessible airports within the geographical area.

5. The satellite constellation launch system of claim 1, wherein the carrier aircraft is a single fuselage aircraft.

6. The satellite constellation launch system of claim 1, wherein the carrier aircraft is configured to determine mission information indicating one or more of flight conditions for the aircraft, the mission information affecting the accessible range of the aircraft such that that one of the first launch site and second launch site are not suitable for aerial launching the first satellite into the first orbit or the second satellite into the second orbit, respectively, and in response, carry one of the first and second launch vehicles to a third launch site, wherein the third launch site comprises a third geographical position, within the geographical area, and a third launch time.

7. The satellite constellation launch system of claim 1, wherein the accessible range of the aircraft is determined based on one or more of a fuel capacity of the aircraft, a maximum speed of the aircraft, a cruising speed of the aircraft, a cruising altitude of the aircraft, and a cargo capacity of the aircraft.

8. The satellite constellation launch system of claim 1, wherein the first orbit is different than the second orbit.

* * * * *

UNITED STATES PATENT AND TRADEMARK OFFICE
CERTIFICATE OF CORRECTION

| | | |
|---|---|---|
| PATENT NO. | : 12,024,313 B1 | Page 1 of 1 |
| APPLICATION NO. | : 16/998516 | |
| DATED | : July 2, 2024 | |
| INVENTOR(S) | : Fuller | |

It is certified that error appears in the above-identified patent and that said Letters Patent is hereby corrected as shown below:

On the Title Page

Column 1, Item (51), under "Int. Cl.", Line 2, delete "*B64C 39/02* (2023.01)".

Page 2, Column 1, Item (51), under "Int. Cl.", Lines 1-4, delete
"*B64G  1/10*      (2006.01)
*B64G  1/24*      (2006.01)
*B64U  10/25*    (2023.01)
*B64U  101/60*  (2023.01)".

In the Claims

In Column 16, Claim 4, Line 35, after "on" delete "based".

Signed and Sealed this
Twenty-second Day of April, 2025

Coke Morgan Stewart
*Acting Director of the United States Patent and Trademark Office*